United States Patent [19]

Altenberger

[11] 3,852,541

[45] Dec. 3, 1974

[54] BURGLAR ALARM ACTUATED BY CUT TELEPHONE WIRE

[76] Inventor: Edmund C. Altenberger, Box 595, Bernardsville, N.J.

[22] Filed: Aug. 10, 1973

[21] Appl. No.: 387,462

[52] U.S. Cl. .......... 179/175.25, 179/5 R

[51] Int. Cl. .......... H04m 3/22

[58] [56] References Cited

UNITED STATES PATENTS 3,767,867 10/1973 Altenberger .......... 179/5 R

*Primary Examiner*—Ralph D. Blakeslee

[57] ABSTRACT

A burglar alarm which is actuatable by cutting of a telephone set wire such as located outside of a residence home, the alarm relay switch-actuating circuit being connected to either battery and/or DC-rectified AC-power source, the detector and actuating circuitry of a preferred embodiment including leads of the device being advantageously connectable to telephone wire contacts of either polarity — being connectable to "either" positive or negative polarity and thus avoiding problems of erroneous matching of polarity which heretofore would render the alarm device inoperative and/or subject to false-alarms upon line change of polarity during use of the telephone, each lead of the device being inter-connected with the other lead thereof through a bridging telephone(s)-capacitor(s)-discharging resistor-interconnection and each lead thereafter including adjacently thereafter in series a resistor and thereafter continuing-in-series both leads connected to input different terminals (one lead per terminal) of a common full-wave bridge-rectifier having negative and positive output terminals and leads therefrom having in parallel across the positive and negative leads each of a resistor, a zener diode, and a field effect transistor (FET), the negative lead of the bridge-rectifier being connected to the FET gate terminal and to the diode such that electrons are flowable solely from said negative lead to said positive lead, and the positive lead of the bridge-rectifier being connected to each of the FET source and to a base of typically an NPN transistor, the FET drain being connected in series through a fourth resistor and a relay switch coil to the NPN collector and the FET drain being further connected through the fourth resistor to the positive current power source, a relay switch being actuatably closable of an alarm power circuit, the NPN emitter being connected to a negative terminal power source current of the relay alarm switch-actuating circuit, and a relay-actuatable switch being operatively connected in series in an alarm circuit.

15 Claims, 2 Drawing Figures

BURGLAR ALARM ACTUATED BY CUT TELEPHONE WIRE

The present invention relates to a burglar alarm device associated with a telephone, indicative of severed telephone wire(s). This is a CIP of USSN 275,556 filed 1973 entitled the same.

BACKGROUND

Prior to the present invention, there have existed various devices for summoning the police upon actuation thereof, by either a straight signal, or a pretaped message which automatically dials the police and upon the police answering give the recorded message. These devices have, however, a common defect — that being that if the burglar or rapist or other intruder or would-be intruder is sufficiently seasoned in the ways of crime commition, he will inevitably cut the telephone line (wire) on the outside of the home or building such that the telephone together with all of the aforementioned types of burglar alarms become totally inoperative. This has proven to be factually the course of procedure followed in numbers of recent rape crimes, for example, where the woman known to be alone in the house is left virtually defenseless in so far as having any means of summoning help. At least a knowledge that a telephone line has been cut gives the victim or intended victim so advance warning. U.S. Pat. No. 3,767,867, issued on Oct. 23, 1973 on the above-noted parent application USSN 275,566, is directed toward giving such advance notice by providing an alarm actuatable by the cutting of telephone wires. One problem associated with the device of the above-noted invention is a delayed-alarm-response once the sensitive device has been triggered by cut wires, the delay being occasioned by residual charge(s) on telephone capacitor(s) of telephone set(s) in the dwelling and/or building, the problem growing in magnitude as the number of telephones in the dwelling and/or building increase. One problem in the prior device was that triggering was delayed if solely merely one wire at-a-time, and not both telephone wire(s), is cut or severed, and also the major problem of erroneous connection initially and/or problems arising from changes in telephone-line polarity of a telephone line wire as dependent upon particular use(s) of the telephone conventionally; for some telephone systems throughout the United States, a special code number must be dialed to get-out-of the local area and connected to another geographical area, prior to the dialing of the telephone number itself, and when this code number is dialed, the telephone system frequently is set-up such that a reversal of polarity(ies) of the wire(s) is brought about in order to initiate the local charge-billing system (dollar-charge for the telephone call). The parent invention would bring-about a false alarm each time there was a reverse of polarity, for the above-noted prior patented invention of the present inventor.

SUMMARY OF THE INVENTION

Accordingly, objects of the present invention include the avoiding and/or overcoming of the type(s) of problems(s) and difficulties discussed above, together with additional advantages.

Accordingly, the objects and solutions to the obtaining of such objects of the parent invention are also a part of this present invention and are accordingly included herein, the entire disclosure of the above-noted parent patent issued from U.S. Ser. No. 275,556 filed 1973 of the same title, being hereby incorporated by reference in its entirity into and as a part of this disclosure.

Another object of the present invention is to obtain a device as set forth in the parent invention of the above-noted parent patent, which is battery operatable irrespective of whether power lines have or not been severed also, such that the alarm is nevertheless actuatable when telephone wire(s) is/are cut, and it being an identical object for also this improved alarm device of the present invention.

Other objects become apparent from the preceeding and following disclosure.

One or more objects of the present invention are obtained by the invention(s) as defined herein.

In particular, for both the parent invention of the above-noted patent (of U.S. Ser. No. 275,556) and the present invention, insofaras alarm circuits thereof are substantially and/or totally identical, there is no necessity that an AC to DC current rectifier be present nor a transformer be present for step-down if in fact merely there is substituted — as the DC power source — a battery-power mechanism and circuitry of any conventional type, furnishing the equivalent power and voltages as set forth for the rectifier/transformer power source, additionally and particularly it being noted that the invention as set forth in the parent patent (above-noted) remains precisely the same except that the prior need for the capacitor (identified as 25 in each of the prior patent disclosure and in the present FIG. 1) following the rectifier diode (identified in both the prior patent disclosure and in the present FIG. 1 as 18) is not needed — this capacitor being necessitated solely when an AC current has been converted to half-cycle DC, the capacitor serving to make-available the remaining half-cycle to give a smooth DC. It being conventional to connect batteries and/or battery mechanism(s), typically solely the connections to a battery system requires the connection of the (for example) NPN base (negative) connected to the proper battery terminal, and the circuitry lead 15 (of each of the parent patent and the present FIG. 1) being connected to the remaining proper battery lead, such not being of an order of complexity as to require a drawing illustration of a connected battery, it merely being the substitution of a battery-direct current source for a DC out-side source or an AC-to-DC converted outside source, the latter being illustrated since that would be more involved and would be a conventional situation. It equally would not be additional invention to nor require illustration of provid(ing) a battery charger always operative until power-lines are cut. Accordingly, when battery power is employed, the capacitor for providing the remaining half-cycle of AC-to-DC rectified (and stepped-down) current, is no longer necessary for the inventive device as broadly defined.

To avoid the possibility of delayed setting-of of the alarm once the wire(s) has/have been cut, and to avoid a delay of any triggering of the alarm upon the cutting of solely a single one of the two telephone wires, there is provided a shorting-resistor across the telephone wires in order to promptly discharge residual charges normally present on capacitor(s) of each and all telephone sets within a dwelling and/or building(s), and thereafter — in moving toward the remainder of the mechanism of the alarm device, there occurs on each device lead a resistor — for each of the parent invention and the present invention; thereafter, however, the parent inventive device differs from that of the present invention by the present invention incorporating a full-wave bridge-rectifier with the respective resistor leads being one connected to one input terminal of the bridge-rectifier and the other connected to the remaining input terminal of the bridge-rectifier, and thereafter the positive out-put terminal of the bridge-rectifier being connected to the positive lead of the device as identical in both the parent invention and the present invention, the device positive lead being connected to the FET source and to a base of typically an NPN transistor (or a PNP according to the disclosure of the parent invention) while the device negative lead is connected to the FET gate terminal and to the diode such that electrons are flowable solely from said negative lead to said positive lead, and the remainder of the device of the parent invention and the present invention being identical in all other respects, except to the extent noted above for battery operation.

Additionally, there is provided a shorting test-switch across the negative and positive leads or across the positive and negative terminals of the bridge-rectifier output terminals, the closing of the switch serving to test the operation of the alarm by the thereby triggering thereof.

The operation of the circuitry, except as noted above, is the same as for the parent invention disclosure, which has been above-incorporated-by-reference.

THE FIGURES

DETAILED DESCRIPTION OF THE INVENTION

Figures 1, 2:
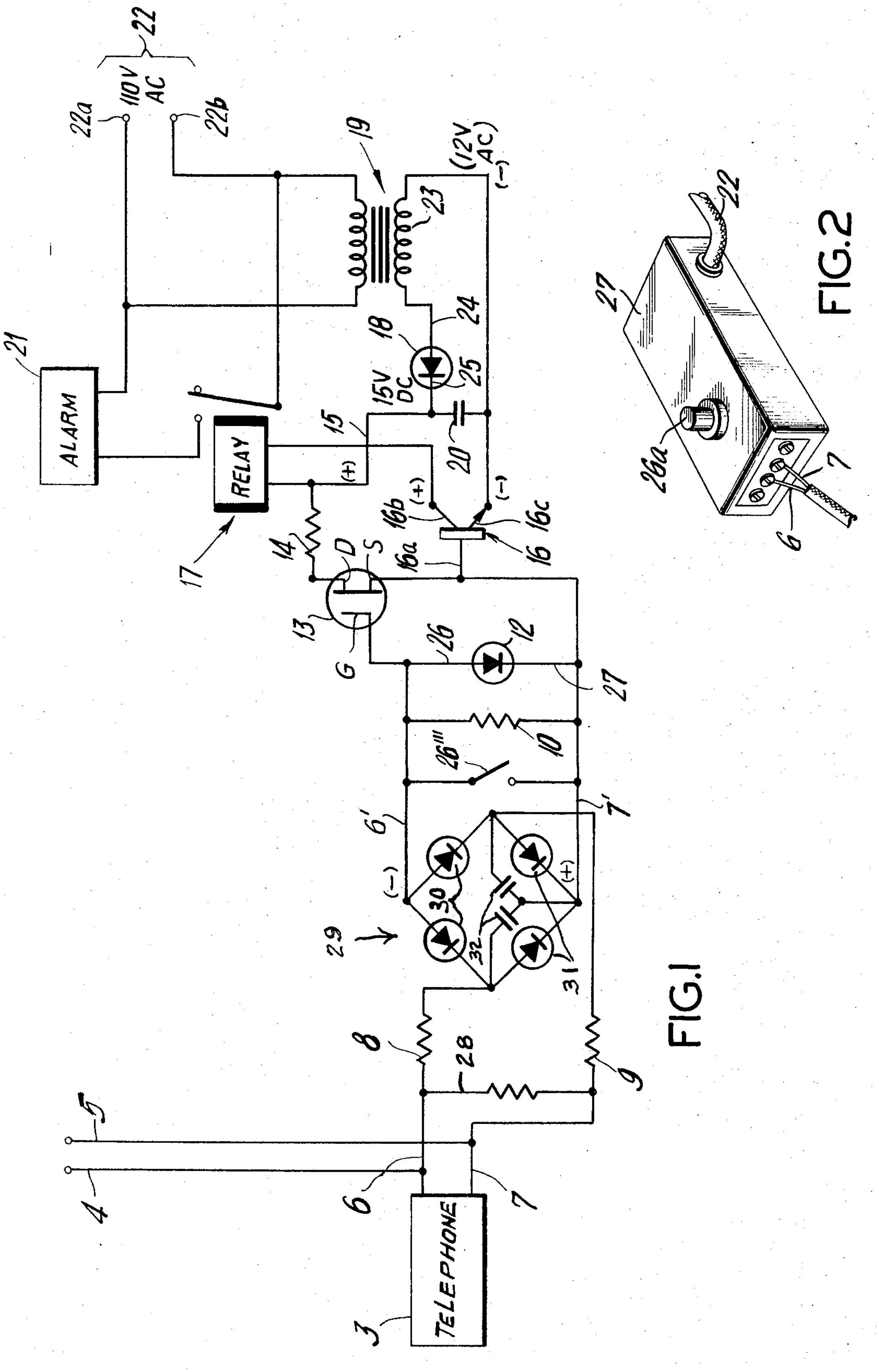
FIG. 1 illustrates a preferred embodiment of the typical circuitry of the present invention, diagrammatically.
FIG. 2 is a typical possible appearance of an encased unit of the present invention, as illustrated in perspective side view.

The numerals of the above-noted Figures correspond to the identically identified parts, elements, and circuitries, etc. of the parent invention of the above-noted patent incorporated-by-reference into the present disclosure, and the functions thereof are identical, repetition thereof at this time being redundant and therefore only as pertinent to this improved invention are numerals hereafter referred to, together with numerals new to this invention for purposes of identification and clarity in the description thereof. Similarly, although varying embodiments are not set forth for the present invention whereas such varying embodiments were set-forth in some detail for the parent envention, the same variations are consistent and adaptable to the present invention in the same manner as the parent invention could be modified.

Accordingly, for the present invention, it is immaterial which lead of the device is connected to which lead of the telephone wires, i.e., whether lead 6 is connected to wire 4 —as illustrated and wire 7 as connected to wire 5 — as illustrated, or alternatively reversably connecting lead 6 to wire 5 and lead 7 to wire 4 — insofar as the alarm device is concerned, because of the illustrated four-sided four-diode — with corresponding two capacitor tie-in — as illustrated — full-wave bridge-rectifier (which bridge rectifier is of conventional type and construction, as illustrated) which with its negative lead output is connected to the gate of the FET transistor 13 as well as connected to the lead 26 of the zener diode 12 and to a lead of the resistor 10 and to a lead of the test-switch 26''', this negative lead being identified as lead 6'. The resistors 8 and 9 occur between the respective telephone wires 4 and 5 ( and the connected device leads 6 and 7) and the input terminals of the full-wave bridge-rectifier. Starting with the negative lead 6' and the positive lead 7', the remainder of the disclosed circuitry does not differ from the original disclosure, it being above-noted that the capacitor 20 is not necessary when in substitution for the disclosed transformer 19 and rectifier 18 there is substituted appropriate and conventional corresponding battery leads of a battery power source.

Typically, the bridging resistor 28 is of 1 megohm; similarly the resistors 8 and 9 are typically of 1 megohm; the full-wave bridge-rectifier 29 has the two one-way flow rectifier diodes 30 leading from the negative lead 6' to the connections with the resistors 8 and 9, and has the two one-way flow rectifier diodes 31 connected with the resistors 8 and 9 for electron flow solely toward postive lead 7' and repsectively in parallel with the rectifier diodes 31 there being capacitors 32 each respectively.

It is within the spirit and scope of the present invention to make such variations and/or modifications as would be apparent to a person of ordinary skill in this art, including also the substitution of equivalents.

I claim:

1. A telephone set cut-line alarm device, comprising in combination: separate positive and negative connector leads; at least each of a first resistor means and a zener diode connected across said leads; at a corresponding end of each of said connector leads, second and third resistor means connected one per lead in series, and at an opposite end of each respective resistor means each resistor means being connectable to a telephone-set line of optional polarity; said zener diode being connected for unidirectional electron flow from said negative lead to said positive lead; a field effect transistor having separate gate, drain and source leads, said gate lead being connected to said zener diode at a negative lead thereof; first switch means having second circuit input and output switch contacts for turning on and off respectively a first current flow controllable of a first relay-activation circuit-second current flow, said first switch means being operatively connected to one of said source leads and to said drain lead of said field effect transistor; a first capacitor means having first and second leads at least one of which is operatively connected to said zener diode at a positive terminal thereof such that discharge of potential at said gate takes place whenever telephone line voltage on either of said connector leads is terminated or significantly decreased, such that the gate potential is prior to discharge, of a predetermined magnitude large enough to prevent current flow through said drain to said source; a second current-flow circuit including in series within said second current-flow circuit a direct current means providable of direct current, first relay means having first-circuit input and output actuation leads connected for activating said first relay means, and said switch of said first switch means, and operatively connected to said source lead; fourth resistor means connected between said drain lead and one of said first relay means input and output leads; and said first relay means including alarm-circuit switch contacts, said first relay input lead being connected in series with one of said first switch means second circuit contacts; and said capacitor means being for attenuating AC current.

2. An alarm device of claim 1, in which said first switch means comprises a base/emitter/collector transistor having base, emitter and collector leads, one of said first switch means second-circuit input and output switch contacts being connected to said emitter lead and the other of said first switch means second circuit input and output switch contacts being connected to said collector lead.

3. An alarm device of claim 2, in which the first lead of said first capacitor means is connected to said zener diode at a positive terminal thereof.

4. An alarm device of claim 3, in which the base/emitter/collector transistor is an NPN transistor, said collector being connected to one of said first relay means input and output leads.

5. An alarm device of claim 3, and an alarm circuit including in series with one-another an electrically responsive alarm, said alarm-circuit switch contacts, and said primary coils.

6. An alarm device of claim 5, in which said direct current means comprises step-down transformer means including primary and secondary coils, and rectifier means for imparting direct current to said second circuit in a flow-direction toward said collector lead, toward said drain lead, from said emitter lead and from said source lead; and including a second capacitor means connected between said first relay means actuating input lead and output lead.

7. An alarm device of claim 6, in which said alarm circuit is about 110 volts AC, in which said transformer secondary coil is about 12 volts AC, and in which said second current-flow circuit is about 15 volts DC.

8. An alarm device of claim 3, in which said base/emitter/collector transistor is a PNP transistor and in which said emitter lead is connected, in series in said second current-flow circuit.

9. An alarm device of claim 8, and an alarm circuit including in series with one-another an electrically responsive alarm, said alarm-circuit switch contacts, and said primary coils, and in which said direct current means comprises step-down transformer means including primary and secondary coils; and rectifier means for operatively imparting direct current from said secondary coil to said second circuit in a flow-direction of electrons toward said emitter lead, and toward said source lead; and including a second capacitor means connected between said first relay means actuating input lead and output lead.

10. An alarm device of claim 9, in which said alarm circuit is about 110 volts AC, in which said transformer secondary coil is about 12 volts AC, and in which said second current flow circuit is about 15 volts DC.

11. An alarm device of claim 1, including bridge rectifying means for attenuating AC current and operatively connected across said positive and negative connector leads and operatively connected between (a) said positive and negative connector leads and (b) the second and third resistor means in series between the second and third resistor means and the positive and negative connector leads, such that at said connected end of each of respective resistor means either positive or negative polarity resulting from interchangeable telephone-set line connections is functionally operative for the alarm device.

12. An alarm device of claim 11, in which said capacitor means comprises two capacitors each at a first terminal thereof connected to a positive terminal of the zener diode and one of the two capacitors connected operatively at its remaining terminal to one of said second and third resistor means and the other of the two capacitors connected operatively at its remaining terminal to the other of said second and third resistor means, and said rectifier means including first and second rectifier elements with one thereof connected across said one of the two capacitors and the other rectifier element connected across the other of the two capacitors, the third and fourth rectifier elements one being in series between the negative connector lead and one of said second and third resistor means and the other of the third and fourth rectifier elements of said rectifier means connected in electrical series operatively between the positive connector lead and another of said second and third resistor means.

13. An alarm device of claim 12, and at said opposite ends away from the rectifying means, connected between said second and third resistor means, a fifth resistor means, such that discharge of telephone-set capacitor is prompt thereby avoiding delayed triggering of the first relay means.

14. An alarm device of claim 1, and at said opposite ends away from said connector leads, a fifth resistor means connected between said second and third resistor means, such that discharge of telephone-set capacitors is prompt thereby avoiding delayed triggering of the first relay means.

15. A telephone set cut-line alarm device, comprising in combination: separate positive and negative connector leads; connected across said leads at least each of a first resistor means and a zener diode; at a corresponding end of each of said connector leads, second and third resistor means connected one per lead in series, and at an opposite end of each respective resistor means each resistor means being connectable to a telephone-set line of identical polarity; said zener diode being connected for unidirectional electron flow from said negative lead to said positive lead; a field effect transistor having separate gate, drain, and source leads, said gate lead being connected to said zener diode at a negative lead thereof; first switch means having second circuit input and output switch contacts for turning on and off respectively a first current flow controllable of a first relay-activation circuit-second current flow, said first switch means being operatively connected to one of said source leads and to said drain lead of said field effect transistor; a first capacitor means having first and second leads, and operatively connected to said zener diode at at-least a positive terminal thereof such that discharge of potential at said gate takes place whenever telephone line voltage on either of said connector leads is terminated or significantly decreased, such that the gate potential is prior to discharge, of a predetermined magnitude large enough to prevent current flow through said drain to said source; a second current-flow circuit including in series within said second current-flow circuit a direct current means providable of direct current, first relay means having first-circuit input and output actuation leads connected for activating said first relay means, and said switch of said first switch means, and operatively connected to said source lead; said first relay input lead being connected in series with one of said first switch means second circuit contacts; fourth resistor means connected between said drain lead and one of said first relay means input and output leads; and said first relay means including alarm-circuit switch contacts.

* * * * *

UNITED STATES PATENT OFFICE
CERTIFICATE OF CORRECTION

PATENT NO. : 3,852,541

DATED : December 3, 1974

INVENTOR(S) : Edmund C. Altenberger

It is certified that error appears in the above-identified patent and that said Letters Patent are hereby corrected as shown below:

The term of this patent subsequent to October 23, 1990, has been disclaimed.

Signed and sealed this 3rd day of June 1975.

(SEAL)
Attest:

RUTH C. MASON
Attesting Officer

C. MARSHALL DANN
Commissioner of Patents
and Trademarks